United States Patent [19]

Wardle

[11] Patent Number: 5,438,839
[45] Date of Patent: Aug. 8, 1995

[54] FREEZING APPARATUS AND METHOD

[75] Inventor: David G. Wardle, Tadworth, England

[73] Assignee: The BOC Group, Inc., New Providence, N.J.

[21] Appl. No.: 205,981

[22] Filed: Mar. 4, 1994

[30] Foreign Application Priority Data

Mar. 26, 1993 [GB] United Kingdom ............... 9306301

[51] Int. Cl.⁶ .................... F25D 17/02; F25D 25/02; F25C 1/00
[52] U.S. Cl. .......................................... 62/63; 62/64; 62/71; 62/374; 62/381; 62/345; 62/353
[58] Field of Search ............... 62/63, 64, 71, 345, 62/353, 374, 381; 239/487

[56] References Cited

U.S. PATENT DOCUMENTS

| | | | |
|---|---|---|---|
| 2,480,727 | 8/1949 | Greyson | 62/63 |
| 2,784,566 | 3/1957 | Reynolds | 62/71 |
| 2,784,567 | 3/1957 | Reynolds | 62/71 |
| 3,245,226 | 4/1966 | Wentworth et al. | 62/381 X |
| 3,472,041 | 10/1969 | Amerio | 62/381 X |
| 3,662,565 | 5/1972 | Gram | 62/345 |
| 4,103,507 | 8/1978 | Benois | 62/63 |
| 4,261,183 | 4/1981 | Plomp | 62/381 |
| 4,406,407 | 9/1983 | Aprea et al. | 239/487 |
| 4,527,401 | 7/1985 | Nelson | 62/354 |
| 4,760,712 | 8/1988 | Hashimoto | 62/381 |
| 4,843,840 | 7/1989 | Gibson | 62/375 |
| 4,922,723 | 5/1990 | Broadbent | 62/353 X |
| 4,998,464 | 3/1991 | Kubacki | 62/354 X |
| 5,307,646 | 5/1994 | Niblock | 62/345 |

FOREIGN PATENT DOCUMENTS

| | | |
|---|---|---|
| 1264439 | 2/1972 | United Kingdom . |
| 1376972 | 12/1974 | United Kingdom . |
| 2023789 | 1/1980 | United Kingdom . |
| 2092880 | 8/1982 | United Kingdom . |
| 2117222 | 10/1983 | United Kingdom . |

Primary Examiner—Christopher Kilner
Attorney, Agent, or Firm—David A. Draegert; R. Hain Swope; Larry R. Cassett

[57] ABSTRACT

An apparatus for freezing particulate bodies, comprising a rotary member having a generally horizontal freezing surface, means for dispensing said bodies onto said surface, means for cooling the surface to a freezing temperature and means for collecting said bodies in at least peripherally frozen state from said surface. The particulate bodies may comprise food stuffs, such as prawns or cream, a pharmaceutical, a microbiological culture, or a pureé. Liquified carbon dioxide and nitrogen are preferred for cooling.

23 Claims, 4 Drawing Sheets

FREEZING APPARATUS AND METHOD

BACKGROUND OF THE INVENTION

This invention relates to freezing apparatus and method, and in particular to the conversion into a solid particulate product of a flowable material capable of being frozen or to the freezing of discrete foodstuffs such as prawns, scampi and peas. The flowable material may for example be a dairy product (for example cream, milk or yoghurt), liquid egg, a soup, a pharmaceutical, a microbiological culture, or a pureé.

Various prior proposals have been made for methods of freezing dairy products into discrete particulate form. GB-A-1 264 439 describes direct contact of egg or dairy produce with a liquefied gas refrigerant to give pop-corn-like particles. GB-A-1 376 972 describes a small scale system for production of pellets of egg by causing the egg to fall from nozzles into liquefied gas or refrigerant.

GB-A-2 092 880 discloses a method and apparatus for producing buoyant frozen pellets of liquid, preferably cream, by causing drops of liquid to fall onto or into a liquefied gas. GB-A-2 117 222 and U.S. Pat. No. 4,843,840 disclose methods and apparatus for producing discrete bodies of frozen liquid, eg cream, by passing a pulsating flow of the liquid into or onto a stream of liquefied gas.

One disadvantage of such apparatus and methods as described in the aforementioned prior proposals is that difficulties arise in obtaining economical utilisation of the liquefied gas particularly when there is a large demand for the particulate material.

It has been proposed in GB-A-2 023 789 to freeze seafood such as prawns or scampi by depositing the seafood on the outer surface of a rotary drum having a horizontal axis of rotation cooling the inner surface of the drum by exposure to a cryogenic medium such as liquid nitrogen and spraying liquid nitrogen directly onto the seafood. Such an apparatus is unsuitable for freezing liquids.

SUMMARY OF THE INVENTION

According to the present invention there is provided apparatus for freezing particulate bodies, comprising a rotary member having a generally horizontal freezing surface, means for dispensing said bodies onto said surface, means for cooling said surface to a freezing temperature and means for collecting said bodies in at least peripherally frozen state from said surface.

The invention also provides a method for freezing particulate bodies, comprising dispensing said bodies onto a generally horizontal freezing surface of a rotating member, cooling said surface to a freezing temperature, freezing at least the periphery of each such body by contact with the cooled surface, and collecting said at least peripherally frozen bodies from the said surface.

One advantage offered by the method and apparatus according to the invention is that a high utilisation of the freezing surface can be achieved thus enabling relatively high rates of production of at least partially frozen bodies of material to be produced from a freezing surface of a given area. Such utilisation of the area is greater than that which can be achieved by operation of the apparatus disclosed in the aforementioned prior document GB-A-2 023 789.

The bodies may be of a liquid or a solid. The liquid may consist of a single component but will generally comprise two or more components, being in the form of an emulsion, dispersion, slurry or solution. Typically, the liquid is aqueous. The apparatus according to the invention is suitable for freezing viscous or mucilaginous liquid. If the viscosity of the liquid is such that it does not readily flow at ambient temperature with the result that pumping is difficult at such temperatures, the liquid may be heated to a temperature at which its viscosity is sufficiently low to enable it to be pumped to said dispensing means. Examples of particulate foodstuffs that may be frozen in accordance with the invention include such seafoods as prawns and scampi, peas and chopped egg.

The rotary member is preferably a plate having a flat upper surface which functions as the freezing surface. The plate is typically disc-shaped. The rotary member is preferably formed of thermally conducting material which is not embrittled at the temperatures to which it is subjected in operation. Suitable materials include copper, nickel, aluminium and stainless steel. A particularly suitable disc comprises the combination of a base of comparatively high thermal conductivity, such as for example copper or aluminium, coated with an inert layer of, for example stainless steel. The stainless steel, being inert and easily cleaned is particularly well suited to contacting with food products whilst the base, having a comparatively high thermal conductivity lends itself to rapid chilling of the food product.

The dispensing means preferably comprises at least one nozzle.

The said nozzle preferably communicates with the outlet of a pump. Preferably the pump is a peristaltic pump. A peristaltic pump is able to provide a pulsating flow of a liquid feedstock. If desired, in order to give greater flexibility in the rate at which the material may be supplied to the said nozzle, the inlet end of the peristaltic pump may communicate with a second pump having a rotary or reciprocable prime mover. Preferably, there are a plurality of nozzles arranged radially above the freezing surface. The number of nozzles is selected such that in continuous operation of the apparatus according to the invention at least 50 and preferably at least 75% of the area of the freezing surface is occupied at any one time by the said bodies.

The said nozzle is preferably defined by the outlet end of a vertical tube. The nozzle preferably faces the freezing surface. The vertical distance from the said nozzle to the freezing surface is preferably adjustable. If desired, the nozzle may have heating means associated therewith.

The freezing temperature of the surface is preferably in the range of minus 50 to minus 100° C. Preferably, said freezing temperature is created by placing the freezing surface in direct or indirect thermal contact with a cryogenic medium. (By the term "cryogenic" as used herein is meant a temperature of −100° C. or below.) Alternatively, a liquefied gas such as liquid carbon dioxide may be used. The cryogenic medium is preferably brought into thermal contact with the freezing surface in its liquid state or in the form of a mixture of liquid and vapour. Cold vapour resulting from the vaporisation for cryogenic liquid is preferably led across the rotary member so as to exchange heat with it and/or the bodies.

If the rotary member is a plate, the cryogenic medium, preferably liquid nitrogen, may be contacted with either the freezing surface itself or the underside of the plate depending on the thickness and thermal conductivity of the plate. It is, however, generally preferred to employ means that direct liquid cryogenic medium at the freezing surface itself so as to bring it into contact with the bodies as well as the surface. Typically, a liquid cryogenic medium (or liquid carbon dioxide) is contacted with the chosen surface by being sprayed thereagainst. In the event that the surface chosen for contact with the cryogenic medium is the freezing surface, care may need to be taken so as to avoid the kinetic energy of the spray from forcing the bodies of material off the plate. To this end, the liquid cryogenic medium is preferably dispensed from means comprising at least one nozzle able to impart a swirling motion to the medium and to cause it to exit the said nozzle in the form of a divergent cone. Further, the nozzle is typically located a distance from the freezing surface greater than 100 mm. If desired, the outer periphery of the freezing surface may be contiguous to a retaining wall which is able to act as a barrier preventing the displacement from the freezing surface by the spray of material or foodstuff to be frozen.

Preferably, liquid cryogenic medium dispensing means is arranged such that in use the bodies are carried by the plate through an arc of at least 90° before being impinged upon by the liquid itself. The rotary member is preferably located in a housing. If the freezing surface is cooled by contact with a cryogenic liquid, there is desirably an outlet for resulting vapour so located that in use vapour tends to flow across the freezing surface and thereby be warmed by it. The flow of the vapour may if desired be assisted by a fan.

The collecting means preferably includes at least one blade having an edge in contact with the freezing surface, said blade being directed such that the bodies (each one frozen all round its periphery) are guided by the blade to the periphery of the plate. The said edge is preferably spring biased into contact with the freezing surface. Preferably there is a plurality of such blades.

A freezing method and apparatus according to the present invention will now be described by way of example with reference to the accompanying drawings.

The drawings are not to scale.

DESCRIPTION OF THE PREFERRED EMBODIMENTS

Referring to FIGS. 1 to 4 of the drawings, a freezing apparatus includes a housing 2 having a lid 4. The housing 2 and the lid 4 define a generally cuboidal freezing chamber 6. The housing 2 and the lid 4 may both be formed with an inner wall or skin 8 of stainless steel and an outer wall or skin 10 also of stainless steel. The outer walls 10 are spaced from the respective inner walls 8 and the spaces contain thermally insulating material 12 such as a foamed plastics material (for example, foamed polyurethane).

Figure 1:
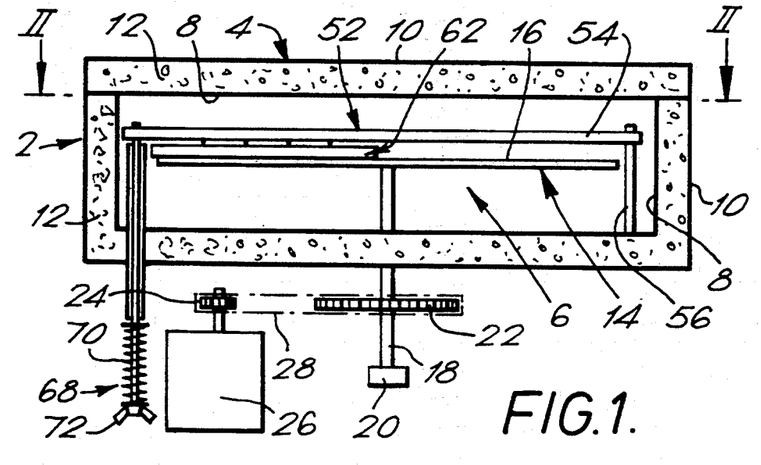
FIG. 1 is a schematic side elevation of a freezing apparatus according to the invention.
Figure 2:
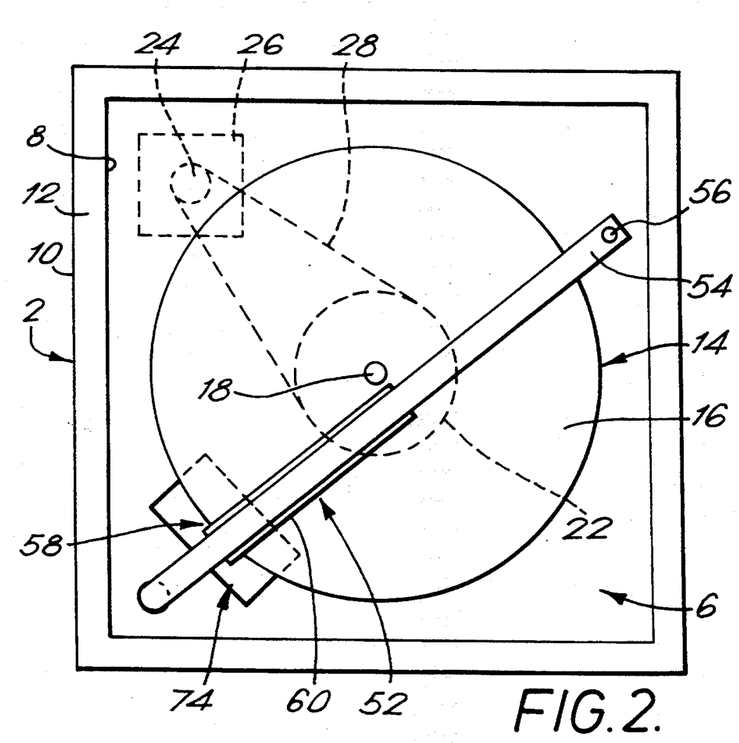
FIG. 2 is a section through the line II—II in FIG. 1.

A rotary, horizontally disposed, disc-shaped, freezing plate 14 is located in the chamber 6. The plate 14 has a flat freezing surface 16. The plate 14 is preferably fabricated from a metal which has a relatively high thermal conductivity and which is not embrittled by contact with a cryogenic medium. Copper, aluminium, nickel and stainless steel are all suitable choices. The plate has a thickness sufficient to give it adequate mechanical strength to resist deformation in use; it is desirable however within these constraints to keep the mass of the freezing plate 14 to a minimum so as to avoid unnecessary consumption of refrigeration in reducing the temperature of freezing surface 16 to a desired level below freezing point and then in maintaining it at that temperature. A thickness in the range of 4 to 8 mm will normally be adequate depending on the diameter of the plate 14 if it is fabricated from stainless steel. It has been found that a particularly good performance can be achieved with a plate 14 formed with a combination of materials. A base layer of a comparatively high thermal conductivity, such as for example copper or aluminium, can be coated with a comparatively thin layer of inert metal, such as for example stainless steel. The stainless steel layer, whilst having a comparatively low thermal conductivity, acts to define an inert and easily cleanable surface well suited for contacting food products. The highly conductive base layer acts to draw heat away from the food producct. The coating may be applied by any one of a number of well known techniques, such as plasma spraying or inductive brazig to name but two.

The plate 14 is centrally mounted on a vertical drive shaft 18 extending through the base of the housing 2. The shaft 18 is supported by a bearing 20 located externally of the housing 2. Since the bearing 20 is situated outside the chamber 6 it is not subjected in normal use to cryogenic temperatures and hence can be of a conventional kind. The shaft 18 carries a first gear wheel 22 outside the chamber 6. A second gear wheel 24 is driven by an electric motor 26. Transmission from the second gear wheel 24 to the first gear wheel 22 is by means of an endless chain 28. The diameter of the second gear wheel 24 is substantially less than that of the first gear wheel 22. Accordingly, in operation, the freezing plate 14 performs a smaller number of revolutions per minute than the second gear wheel 24. Typically, the motor 26 may drive the second gear wheel 24 at a rate of 50 revolutions per minute and the freezing plate 14 may rotate at 0.6 to 6 revolutions per minute.

Figure 3:
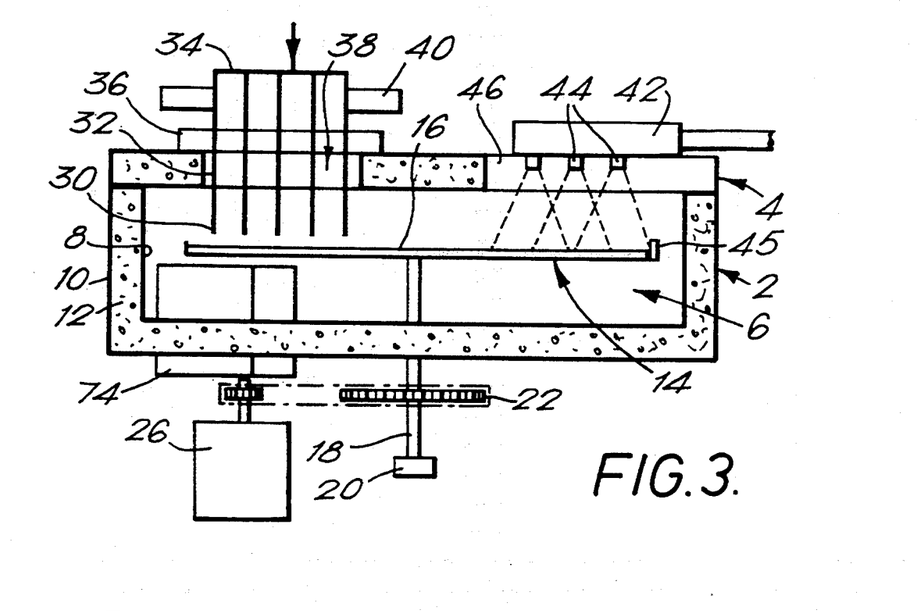
FIG. 3 is another schematic side elevation of the freezing apparatus shown in FIGS. 1 and 2.

As shown in FIG. 3, the freezing apparatus includes a plurality of dispensing nozzles 30. (For purposes of ease of illustration the dispensing nozzles 30 are omitted from FIGS. 1 and 2 of the drawings.) The bottom tips of the dispensing nozzles 30 are disposed along a radius above the freezing surface 16 of the plate 14. The nozzles 30 may be of telescopic or other construction that enables the height of their tips above the freezing surface 16 to be adjusted. The tips of the nozzles 30 are preferably located close to the freezing surface 16. When freezing a liquid of relatively low viscosity the height of the tip of each dispensing nozzle 30 above the surface of the freezing surface 16 of the plate 14 may be in the order of 10 mm. Greater heights are typically employed the greater the viscosity of the liquid being dispensed. Each dispensing nozzle 30 is received in or integral with a complementary tube 32. The tubes 32 communicate with a manifold 34 and extend through a cover 36 of transparent material (for example a clear plastics material such as Perspex) mounted over a slot 38 in the lid 4 of the freezing chamber 6.

As shown in FIG. 3, a manifold 34 communicates with a source (not shown) of the liquid or particulate solid feedstock. A pump 40 of any convenient kind depending on the nature of the material to be frozen may be used to create a flow of the feedstock to the nozzles 30. If the material to be frozen is liquid, formation of the liquid into discrete bodies or pellets is assisted by subjecting the liquid to regular pulsing in or upstream of the manifold 34. Regular pulsing assists in giving a uniform particle size and permits a high rate of injection of pulsed feedstock from each dispensing nozzle 30 onto the freezing surface 16 of the plate 14. Typical pulsation rates are in the range 2 to 20 pulses per second, giving a rate of dispensing at least ten times higher than in systems in which the feed liquid falls from a nozzle under gravity. Examples of suitable pulsing systems include (a) a peristaltic pump 40 with rotating rollers bearing upon a flexible supply line, (b) a peristaltic pump 40 with rollers oversized so as to give a longer pulse, (c) a peristaltic pump 40 with rollers and a pulsed gas supply, (d) a gear pump 40 with a pulsed gas supply and (e) a flexible line repeatedly squeezed by other mechanical, solenoid or pneumatic action.

Figure 6:
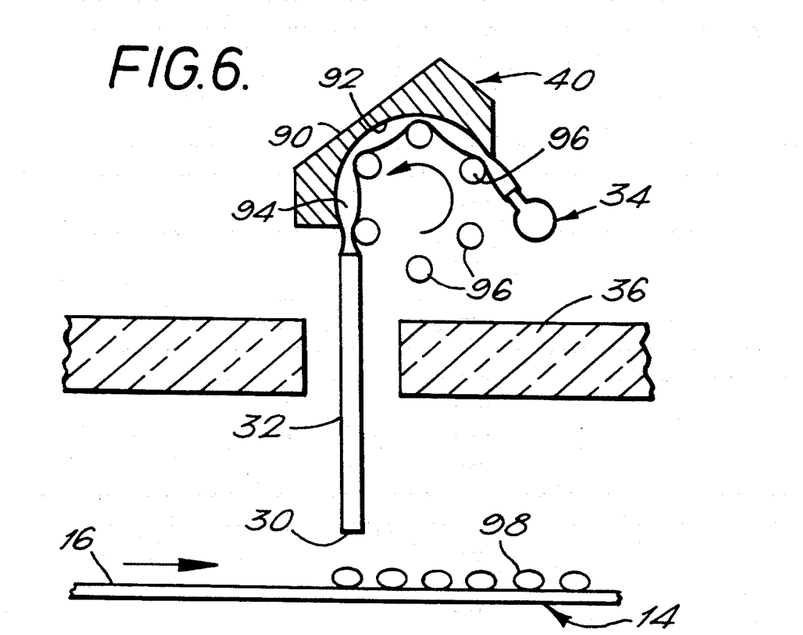
FIG. 6 is a schema illustrating in more detail a liquid feedstock dispenser forming part of the apparatus shown in FIGS. 1 to 4.

One suitable arrangement for dispensing a liquid feedstock is shown in more detail in FIG. 6 of the drawings. A peristaltic pump 40 comprises a body member 90 defining a curved guide surface 92. Silicone rubber tubes 94 (of which only one is shown in FIG. 6) extend from a manifold 34 over the guide surface 92 and through a plastic cover 36 and each terminate in a respective dispensing tube 32, typically formed of stainless steel, whose distal tip constitutes a dispensing nozzle 30. Each nozzle 30 is located a chosen distance above the freezing surface 16 of the rotary plate 14. An array of rollers 96 is adapted to be driven by a motor (not shown in FIG. 6) so as to press the rubber tubes 94 against the guide surface 92 at a plurality of chosen locations. This action causes a pulsed flow of liquid feedstock from the manifold 34 to the dispensing tubes 32. Thus, liquid may be dispensed from the nozzles 30 in the form of discrete bodies 98. The size of the bodies depends in part on the internal diameter of each respective dispensing nozzle 30 which may typically be in the range of 2 to 20 mm.

By making the cover 36 of transparent material, the dispensing of a feedstock may readily be observed and hence any need to adjust the height of the nozzles 30 above the freezing surface 16, the rate of pumping the feedstock to the nozzles 30, or the rate at which the flow of the feedstock is pulsed can readily be detected by an operator of the freezing apparatus.

Figure 4:
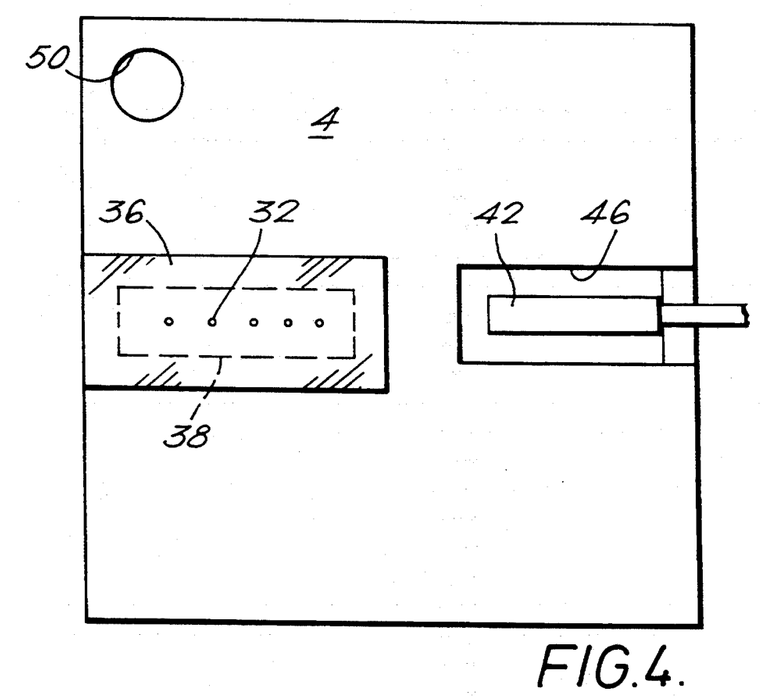
FIG. 4 is a schematic plan view of the lid of the freezing apparatus shown in FIGS. 1 to 3.

The freezing apparatus has, as shown in FIGS. 3 and 4, a spray header 42 for directing liquid nitrogen onto the freezing surface 16 of the plate 14. For purposes of ease of illustration the spray header 42 is omitted from FIGS. 1 and 2. The spray header 42 communicates with a source of liquid nitrogen (not shown) and has a plurality of injection nozzles 44 facing the freezing surface 16 of the plate 14. The spray header 42 is located above the lid 4 and its nozzles 44 project into a slot 46 formed in the lid 4. Alternatively, the spray header 42 may be located within the chamber 2. The liquid nitrogen is typically supplied to the spray header 42 under superatmospheric pressure. A typical supply pressure is in the range 1 to 4 bar gauge. It is desirable to dissipate mechanical energy in the liquid nitrogen upstream of its impact on the freezing surface 16 of the plate 14 or on bodies of material that are being frozen on the plate 14. Preferably, therefore, the injection nozzles 44 of the spray header 42 impart a swirling motion to the liquid nitrogen (or other liquefied gas) flowing therethrough. It is further preferred that liquid nitrogen leaves each injection nozzle 44 in the form of a divergent conical stream or jet. In order to achieve this result the nozzles 44 preferably each have an internal vane (not shown) imparting turbulence to the liquid flow. Such injection of the liquid nitrogen not only helps to reduce its momentum at the freezing surface 14 of the plate 16 but also enables an enlarged surface area to be contacted by the liquid nitrogen, thereby facilitating good heat transfer from the feedstock being frozen to the nitrogen. Reducing the momentum of the liquid nitrogen injected into the freezing chamber 6 reduces a tendency for the nitrogen to displace bodies of feedstock being frozen from the freezing surface 16. (The reason why there is tendency will be explained below.) It is further preferred for this reason to locate the nozzles 44 at a height at least 100 mm above the freezing surface 16 of the plate 14. Even though the tendency for the nitrogen to displace bodies of feedstock from the surface may by such means be reduced, it is preferred to provide the periphery of the plate 14 with a circumferential guard 45 (see FIG. 3) such that if some bodies of feedstock are displaced they will be retained on the freezing surface 16 of the plate 14.

The relative positions of the feedstock dispensing nozzles 30 and the liquid nitrogen injection nozzles 44 are such that the bodies of feedstock travel through an arc of at least 90° and preferably about 180° before coming into direct contact with liquid nitrogen. The relative spacing of the dispensing nozzles 30 is such that as the plate 14 is rotated so bodies of feedstock are dispensed along spaced concentric circular paths. The conical jets of liquid nitrogen that issue from the injection nozzles 44 contact the individual bodies of feedstock and exposed regions of the freezing surface 16 of the plate 14. Since both the plate 14 and the feedstock are at temperatures well in excess of the boiling point of the liquid nitrogen heat is extracted from both the plate 14 and the feedstock, the plate 14 and the feedstock thereby being refrigerated and the nitrogen thereby being vaporised. During operation of the apparatus shown in the drawings, the plate 14 is therefore continuously cooled by contact with liquid nitrogen. The plate 14 thus tends to assume a constant temperature below 0° C. provided that the feedstock is dispensed at a constant rate and temperature and the liquid nitrogen is injected through the nozzles 44 at a constant rate. This temperature is preferably chosen to be in the range minus 50° to minus 100° C. Accordingly, the individual bodies initially contact the freezing surface 16 at a temperature of the latter well below 0° C. If the feedstock is a liquid or a solid having a moist exterior, the individual bodies become rapidly frozen to the surface 16. Typically, the feedstock is dispensed at ambient temperature or a temperature thereabove. Accordingly during their residence on the plate 14, heat is continuously extracted from the bodies by the plate 14. As a result, the exterior surface of each body freezes first, and then the freezing progresses further inwards. Freezing is also assisted by direct contact with liquid nitrogen and to a lesser extent, as will be described below, by contact with nitrogen vapour evolved from the liquid nitrogen.

Contact between the nitrogen vapour and the bodies of feedstock being frozen is facilitated by having an exhaust outlet 50 (see FIG. 4) located in the lid 4 of the apparatus at a region such that nitrogen vapour evolved from the liquid nitrogen flows across the path taken by the bodies as they are carried by the rotary plate 14 from underneath the feedstock dispensing nozzles 30 to underneath the liquid nitrogen injection nozzles 44. Accordingly, the nitrogen vapour tends to assist to some extent in pre-cooling each body upstream of the region where it is contacted directly by liquid nitrogen. Typically, if, as shown in FIG. 4, the dispensing nozzles 30 are located at a nine o'clock position and the spray header 42 in a three o'clock position, the outlet 50 is located in a half past ten position. If desired, the flow of nitrogen vapour can be further assisted by employing a fan downstream of the outlet 50 to draw nitrogen vapour therethrough. Freezing of each body starts at that part of the surface thereof in contact with the freezing surface 16 of the rotary plate 14. As previously stated, formation of an ice bond between each body and the freezing surface 16 occurs rapidly. Once each ice bond is formed it continues to give up heat to the freezing surface 16. The ice bonds are therefore subjected to forces created by thermal contraction. Eventually the ice bonds may reach a temperature typically below minus 50° C. at which they crack. Accordingly, some of the bodies may become disengaged in part or entirely from the freezing surface 16 and therefore the rate of heat flow from the bodies to the freezing surface is diminished. It is therefore desirable to keep to a minimum unduly early cracking of the ice bonds. Direct contact between the liquid nitrogen (or other liquid cryogenic medium) and the bodies assists in freezing those parts of the surface of each body not in contact with the freezing surface 16 and thereby reduces the overall time required for the total freezing of the periphery of each body. Relatively high production rates are thereby made possible. Direct contact with liquid nitrogen may hasten the onset of the ice cracking.

In order to avoid premature cracking of the ice bonds between each body being frozen and the freezing surface 16, overcooling of the freezing surface 16 should be avoided and contact between liquid nitrogen and the bodies is preferably delayed until the bodies have been resident on the rotary plate 14 for some seconds. Preferably, most of the cracking of the ice bonds that takes place occurs downstream of the contact between the bodies being frozen and the liquid nitrogen. Contact with the liquid nitrogen preferably starts after ice bonds securing the bodies to the freezing surface 16 have been formed and is ended before any substantial degree of cracking of the bonds takes place. If some cracking under the liquid nitrogen sprays does take place, some bodies tend to become freestanding on the surface and it is these bodies which tend to be displaced by the liquid nitrogen.

After bodies of material being frozen have been carried by the plate 14 out of contact with the jets of liquid nitrogen they come next to a collecting device 52, shown in FIGS. 1 and 2, including an arm 54 one end of which is fixed to a vertical shaft 56 secured to the floor of the housing 2. For purposes of ease of illustration the collecting device 52 is omitted from FIGS. 3 and 4 of the drawings. Continuing the clock analogy, if the feedstock dispensing nozzles 30 are located in a nine o'clock position relative to the plate 14, the end of the arm 54 opposite the fixed end is in approximately a half past seven position. In other terms, the bodies of material to be frozen are conveyed by the rotating freezing plate 14 through an arc of approximately 315° from the dispensing nozzles 30 to the collecting device 52.

Figure 8:
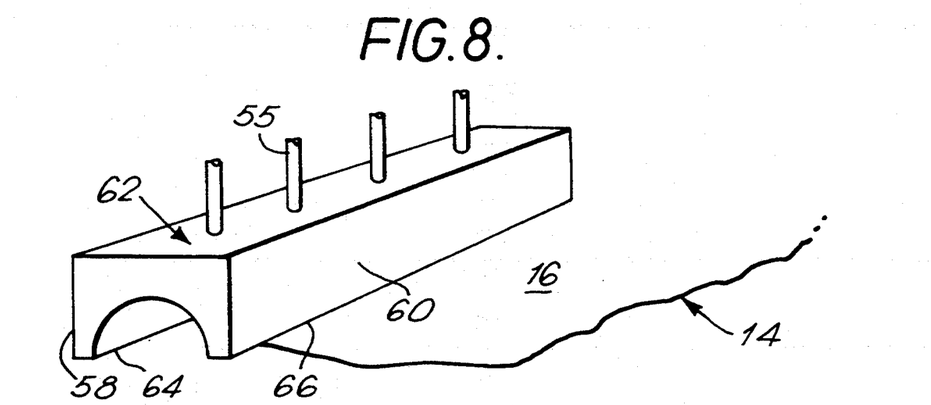
FIG. 8 is a schematic perspective view of the scraping member shown in FIG. 7.

As shown in FIG. 2, the arm 54 of the collecting device 52 does not pass over the centre of the plate 14 but instead extends over a chord having a midpoint close to the centre of the plate. That part of the arm 54 that extends from the midpoint of the said chord to the end opposite the fixed end carries forward and rearward blades 58 and 60 respectively. The blades 58 and 60 are formed of plastics material and, as shown in FIG. 8, are constituted by the respective sides of a generally tunnel shaped member 62 of plastics material. The forward blade 58 has a bottom edge 64 and the rearward blade 60 a bottom edge 66 which engage the freezing surface 16 of the plate 14 (See FIG. 8). The plastics material from which the blades 58 and 60 are formed is relatively soft in comparison with the plate 14 so as to avoid scratching the freezing surface 16 and is of a kind which is not embrittled at the low temperatures to which it is subjected in use. The plastics material may for example be PTFE.

Figure 7:
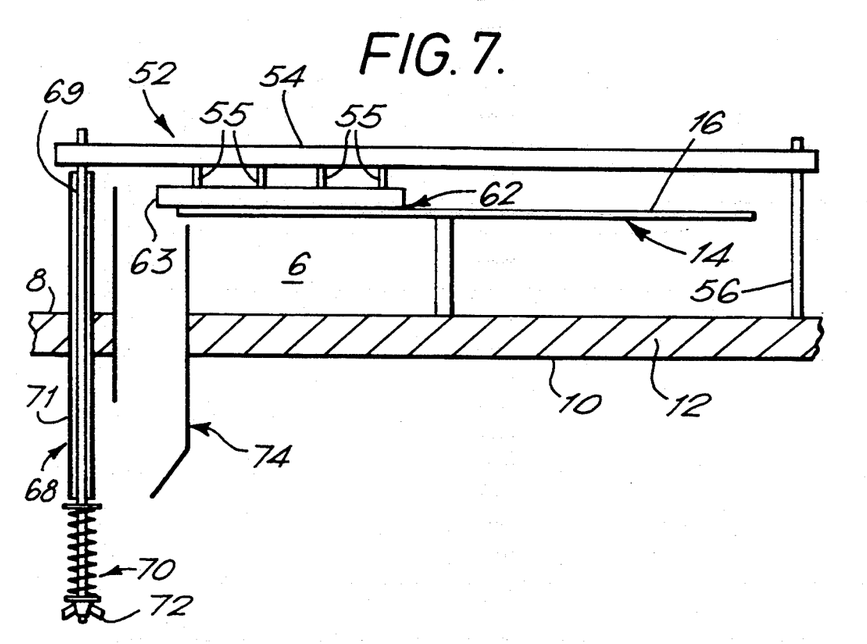
FIG. 7 is a schema illustrating in more detail a product collecting device forming part of the apparatus shown in FIGS. 1 to 4.

As shown in FIG. 1, and in more detail in FIG. 7, the peripheral end of the plastics member 62 is biased into engagement with the freezing surface 16 of the rotary plate 14 by a spring-loaded tensioning device 68 which includes a tension bar 69 that extends vertically downwards from the arm 54 through the floor of the housing 2 to a region outside. This arrangement enables a compression spring 70 associated therewith (which determines the biasing force exerted by the tensioning device 68 on the blades 58 and 60) to be kept at approximately ambient temperature. The biasing force may be set by adjusting a nut 72 located outside the chamber 6.

The blades 58 and 60 cooperate with an outlet chute 74 that extends from beneath the rotary plate 14 through the floor of the housing 2 to a packaging station for frozen product. The blades 58 and 60 are disposed such that frozen bodies disengaged from the freezing surface 16 are guided thereby towards and not away from the outlet chute 74. Some of the bodies become debonded from the surface 16 and in others the bonds are weakened both by thermal cracking upstream of the rearward blade 60 with the result that only a relatively small fraction of the bodies are debonded from the freezing surface 16 entirely by the scraping action of the blades 58 and 60.

Referring specifically to FIG. 7, scraper member 62 depends from the support arm 54, being secured thereto by vertical struts 55. The scraper member 62 has an outer end 63 which projects beyond the periphery of the plate 14 into the mouth of the outlet chute 74, thereby enabling the blades 58 and 60 of the scraper member 62 to guide the frozen bodies into the chute 74. If desired, the chute 74 may feed receptacles (not shown) with the bodies. The chute 74 may have a closure in the form of a flap valve (not shown). In one arrangement, the flap valve may be actuated so as to close the chute 74 on generation of a control signal when the sensed weight of product in a receptacle (not shown) reaches a chosen value. This enables the receptacle to be replaced with an empty one. The valve may then be opened again.

Still with reference to FIG. 7, the tension bar 69 may be surrounded a creep tube 71 which protects the bar 69 from direct contact with cold atmosphere in the chamber 6 and thus helps to maintain the compression spring 72 at approximately ambient temperature. Referring again to FIGS. 1 to 4, the housing 2 is typically supported on a table or legs (not shown).

In operation, the rotation of the plate 14 causes the bodies of feedstock to pass out of contact with liquid nitrogen injected downwardly from the nozzles 44 of the spray header 42 and to be carried towards the rearward blade 60. Although contact between the freezing surface 16 and the bodies of feedstock initially results in the formation of ice bonds that fix the bodies to the surface 16, as described above, a further period of contact between these bodies and the surface (and additionally contact of the bodies with liquid nitrogen) tends to subject the ice bonds to strains caused by thermal contraction that result in the ice cracking such that some bodies become debonded from the surface 16, while in other bodies the bonds are weakened. Accordingly, the edge 66 of the rearward blade 60 is readily able to debond such bodies of feedstock from the freezing surface 16 of the rotating plate 14. The rearward face of the blade 60 prevents the rotation of the plate 14 from carrying the disengaged bodies (or pellets) onward towards the forward blade 58. Accordingly, the pellets travel along the rearward face of the blade 60 and fall over the peripheral edge of the plate 14 into the chute 74. If, nonetheless, any solid material remains firmly engaged to the freezing surface 16 of the plate 14, the rearward blade 60 is able to ride over it, being displaceable against the bias of the tensioning spring 70. The forward blade 58 acts to disengage and collect any material which passes under the edge 66 of the rearward blade 60. All the feedstock that is fed to the dispensing nozzles 30 is thus able to be collected in frozen pelletised form in the outlet chute 74.

The bodies or pellets of feedstock are frozen from the outside inwards. This freezing has typically not been completed by the time each pellet enters the chute 74. Indeed, preferably only an outer "shell" is frozen with the interior of each pellet still in the liquid state as each pellet enters the chute 74. Typically each pellet is received in the chute 74 having an external temperature in the range minus 50° C. to minus 100° C. The pellets are typically but not necessarily disc-or pill-shaped. Each pellet may, for example, have an average weight of 0.4 g such that the innermost portions of them are still above freezing point. If the collected pellets are transferred to a storage container (not shown) which is maintained at below freezing point, the internal temperature of each pellet equilibrates and thus freezing may be completed. An equilibrated temperature in the order of minus 18° C. may readily be achieved.

By the choice of an appropriate number of dispensing nozzles 30 a substantial fraction of the total area of the freezing surface 16 may be occupied with pellets of feedstock.

Accordingly, the apparatus shown in FIGS. 1 to 4 of the drawings is able to freeze feedstock at a relatively fast rate per unit area of the surface 16. Typically, pellets whose average diameter is 6 mm require less than 10 seconds residence time on the freezing surface of the plate 14 in order to be frozen sufficiently to retain their integrity on discharge through the chute 74. Accordingly, the plate 14 may be driven at a speed of 6 revolutions per minute. Larger size pellets will typically require a longer residence time on the plate 14 and hence a lower speed of rotation.

Figure 5:
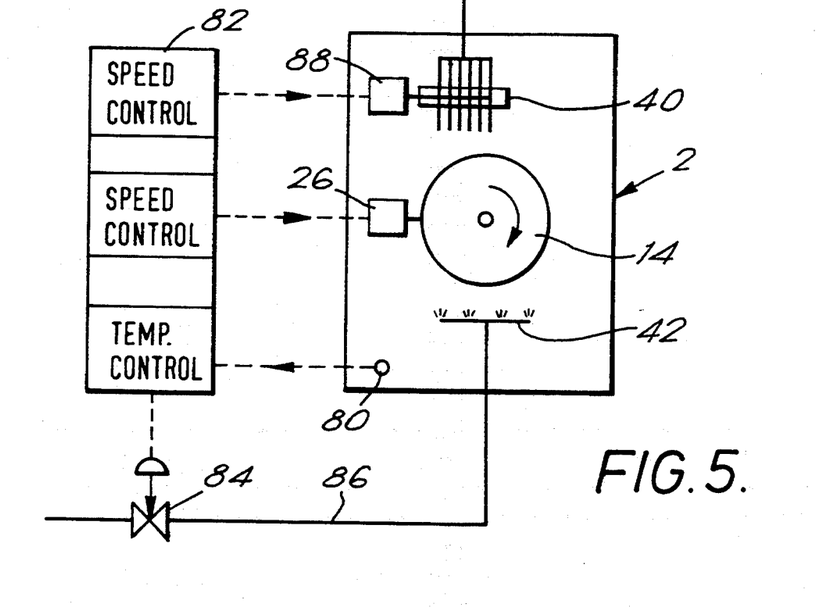
FIG. 5 is a schematic flow diagram illustrating means for controlling the supply of liquid nitrogen and material to be frozen to the apparatus shown in FIGS. 1 to 4.

Referring to FIG. 5 of the drawings, a thermocouple 80 is located within the housing 2 preferably in heat conductive relationship with the freezing surface 16 or in the mouth of the exhaust outlet 50. The thermocouple 80 transmits a signal representative of sensed temperature to a programmable controller 82 which sets the position of a flow control valve 84 in a liquid nitrogen supply conduit 86 communicating with the spray header 42. The controller 82 is preferably of a kind that enables both the speed at which the electric motor 26 rotates the plate 4 and the speed at which a second electrical motor 88 applies pulses to the tubes of a peristaltic pump 40 to be set manually. In normal operation, the rate of flow of feedstock to the freezing apparatus and the speed of rotation of the plate 14 are kept constant and the setting of the valve 84 is adjusted as necessary to keep the temperature of the thermocouple at a set point (say, $-80°$ C.) or between set points. In the event that the sensed temperature falls to an undesirably low temperature (eg minus 150° C.) indicating a failure of the control system, signals are generated by the controller 82 to shut off the supply of liquid nitrogen and to deactuate the motors 26 and 88.

The apparatus as shown in the drawings may be modified to make it suitable for freezing e.g. prawns. For example, the peristaltic pump 40 may be replaced by a device (not shown) for feeding prawns onto the rotary plate 14. The collecting device 52 may be replaced by one (not shown) which employs moving rather than fixed blades. The moving blades may depend from an endless conveyor belt whose path is such that the blades travel over the freezing surface along a chord or diameter towards the periphery of the plate. This collecting device may be adjustable to enable the blades to sweep smoothly across the freezing surface in contact with it thereby enabling the prawns to be carried into the mouth of a collecting chute.

I claim:

1. Apparatus for at least partially freezing particulate bodies comprising:
   (a) a rotary member having a generally horizontal surface for freezing the particulate bodies;
   (b) dispensing means for dispensing particulate bodies in an unfrozen condition onto the horizontal freezing surface;
   (c) cooling means for directing a liquid cryogen to the horizontal freezing surface to lower the temperature thereof sufficiently so that the unfrozen particulate bodies become attached to the horizontal freezing surface through an ice bond and become at least partially frozen; and
   (d) collecting means for collecting the at least partially frozen particulate bodies from the horizontal freezing surface.

2. Apparatus as claimed in claim 1, in which the rotary member is a plate.

3. Apparatus as claimed in claim 2, in which the plate is disc-shaped.

4. Apparatus as claimed in claim 1, in which the dispensing means comprises at least one nozzle.

5. Apparatus as claimed in claim 4, in which the dispensing means comprises a plurality of nozzles arranged radially above the freezing surface.

6. Apparatus as claimed in claim 4, further comprising means for adjusting the vertical distance from the at least one nozzle to the freezing surface.

7. Apparatus as claimed in claim 4, in which the cooling means comprises directing means for directing a liquid cryogen in direct or indirect thermal contact with the freezing surface.

8. Apparatus as claimed in claim 7, in which the directing means further comprises means for bringing the liquid cryogen into contact with the particulate bodies.

9. Apparatus as claimed in claim 8, comprising means for rotating the rotary member at least 90° before the liquid cryogen is contacted with the particulate bodies.

10. Apparatus as claimed in claim 8, in which said directing means comprises at least one liquid cryogen spray nozzle able to impart a swirling motion to the liquid cryogen to form a divergent cone.

11. Apparatus as claimed in claim 4, in which the collecting means comprises at least one blade having an edge in contact with the freezing surface, whereupon rotation of the rotary member causes the particulate bodies to be guided by the blade to the periphery of the plate.

12. Apparatus as claimed in claim 11, further comprising biasing means for urging said edge into contact with the freezing surface.

13. Apparatus as claimed in claim 1 in which the rotary member comprises a base of comparatively high thermal conductivity and a coating of inert material having a comparatively low thermal conductivity.

14. Apparatus as claimed in claim 13 in which said base comprises a disk made from a material selected from the group consisting of copper and aluminum and the coating comprises stainless steel.

15. A method for freezing particulate bodies, comprising dispensing particulate bodies in an unfrozen condition onto a generally horizontal freezing surface of a rotating member, cooling said surface to a temperature so that the unfrozen particulate bodies become attached to the horizontal freezing surface through an ice bond and become at least partially frozen, and collecting at least partially frozen particulate bodies from the said surface.

16. A method as claimed in claim 15, in which the temperature of the horizontal freezing surface is in the range minus 50° C. to minus 100° C.

17. A method as claimed in claim 15, comprising cooling the horizontal freezing surface by direct or indirect thermal contact with a liquid cryogen.

18. A method as claimed in claim 17, comprising directing the liquid cryogen at a region of the freezing surface such that it comes into contact with both the horizontal freezing surface and the particulate bodies.

19. A method as claimed in claim 18, comprising carrying the particulate bodies through an arc of at least 90° before being contacted with the liquid cryogen.

20. A method as claimed in claim 19, in which the liquid cryogen is nitrogen.

21. A method as claimed in claim 19, comprising creating a pulsating flow of liquid and dispensing the pulsating flow onto the horizontal freezing surface to form said at least partially frozen particulate bodies.

22. A method as claimed in claim 21, in which the particulate bodies comprise a particulate foodstuff.

23. A method as claimed in claim 19, in which the particulate bodies comprise prawns or scampi.

* * * * *